(12) United States Patent
Ray

(10) Patent No.: US 7,785,058 B2
(45) Date of Patent: Aug. 31, 2010

(54) MOBILE WHEELCHAIR CARRIER

(76) Inventor: H. Keith Ray, 744 Old Pierce Mill Rd., Big Clifty, KY (US) 42712-8839

( * ) Notice: Subject to any disclaimer, the term of this patent is extended or adjusted under 35 U.S.C. 154(b) by 0 days.

(21) Appl. No.: 12/185,933

(22) Filed: Aug. 5, 2008

(65) Prior Publication Data

US 2010/0034628 A1 Feb. 11, 2010

(51) Int. Cl.
*B60P 3/06* (2006.01)
(52) U.S. Cl. ....................... 414/462; 224/527
(58) Field of Classification Search ......... 414/462–466; 224/520, 527
See application file for complete search history.

(56) References Cited

U.S. PATENT DOCUMENTS

| | | | |
|---|---|---|---|
| 4,593,840 A * | 6/1986 | Chown | 224/520 |
| 4,971,509 A | 11/1990 | Sechovec et al. | |
| 5,018,651 A | 5/1991 | Hull et al. | |
| 5,199,842 A * | 4/1993 | Watt et al. | 414/537 |
| 5,395,020 A | 3/1995 | King | |
| 5,431,522 A | 7/1995 | Ross | |
| 5,586,702 A * | 12/1996 | Sadler | 224/521 |
| 5,853,278 A | 12/1998 | Frantz | |
| 6,379,101 B1 * | 4/2002 | Breaux | 414/537 |
| 6,386,817 B1 | 5/2002 | Cash | |
| 7,083,373 B1 * | 8/2006 | Boudreau | 414/462 |
| 7,510,359 B2 * | 3/2009 | Sperry et al. | 410/119 |
| 2003/0156930 A1 * | 8/2003 | Ahedo, Jr. | 414/462 |
| 2003/0165376 A1 | 9/2003 | Bruno et al. | |
| 2005/0013682 A1 | 1/2005 | Pedrini | |
| 2008/0038104 A1 * | 2/2008 | Mustalahti et al. | 414/495 |
| 2008/0096189 A1 * | 4/2008 | Boone et al. | 435/5 |

\* cited by examiner

*Primary Examiner*—James Keenan
(74) *Attorney, Agent, or Firm*—Townsend and Townsend and Crew LLP

(57) ABSTRACT

A personal vehicle transportation device to protect, secure, and transport a personal vehicle. The personal vehicle transportation device reduces the load placed on the towing vehicle and the personal vehicle transportation device is mechanically operable. The device includes a frame with a platform, a ramp and protective shell attached to opposite sides of the frame. The ramp and protective shell operate substantially simultaneously via a mechanized action. The protective shell includes inflatable bladders to secure the interior cargo.

3 Claims, 9 Drawing Sheets

MOBILE WHEELCHAIR CARRIER

BACKGROUND OF THE INVENTION

1. Field of the Invention

The present invention relates to mobile transportation, and more particularly to a device to safely store a personal mobility device, wherein the device can be attached to and towed behind an automobile.

2. Related Art

An unfortunate side to the human condition is the loss of personal mobility due to age, injury or illness. However, the desire to keep moving has led to the creation of personal mobility devices, from the traditional push-wheelchair to the technologically-advanced electric scooter. With improved personal mobility, further comes the need to travel greater distances with the mobility device. Although traditional push-wheelchairs are designed to fold up and store in an automobile's trunk or backseat, many new designs and especially electric scooters cannot assume a more compact and portable shape.

Designs for transporting mobility devices external to an automobile have evolved to solve many of the transportation problems. One general design is a simple pull-behind trailer attachable to a trailer hitch, such as in U.S. Pat. No. 5,018, 651. Although this design can carry a mobility device, the mobility device is not protected from the elements nor is it secured to the trailer. U.S. Pat. No. 5,395,020 has a more suitable design for wheelchairs and scooters and includes a protective outer cover. However, this design directs the full weight of the trailer and the mobility device on the hitch and frame of the towing vehicle.

A method for distributing the weight of the trailer and mobility device is addressed in U.S. Pat. No. 7,083,373 by strapping the assembly to a point closer to the towing vehicle's axle. U.S. Pat. No. 4,971,509 added a caster-wheel to the underside of the trailer to assume a portion of the load, but it is only utilized when the towing vehicle traverses an uneven surface, which risks damaging the underside of the trailer. The caster-wheel is neither road-worthy nor durable.

None of the above inventions provide for both the proper protection of delicate and expensive mobility devices, from weather or debris, and reduce the stress on the towing vehicle. Furthermore, because protective covers and ramps are often heavy and cumbersome to manipulate, many elderly or infirm users cannot safely operate the transporter or trailer. If a user cannot physically operate the trailer, there is little chance he will be able to enjoy the freedoms associated with the personal mobility device. Thus, there is a need for an improved personal mobility device trailer that is easy to operate, protects the mobility device, and does not overload the towing vehicle.

BRIEF SUMMARY OF THE INVENTION

According to one aspect of the invention, a personal vehicle transportation device includes a frame comprising a substantially horizontal platform, a shell attached to the frame and movable between a first lowered position and a second raised position, the shell substantially covers the horizontal platform when in the first lowered position, a ramp attached to the frame and movable between a first raised position substantially perpendicular to the frame and a second lowered position, a translation mechanism attached to the frame and operationally linked to the shell and the ramp, the translation mechanism may be configured to translate the shell from the first lowered position to the second raised position and translate the ramp from the first raised position to the second lowered position, and a mounting arm attached to the frame and dimensioned and configured to matingly engage a towing vehicle.

The shell may include an opening defined therein and the opening may be substantially covered by the ramp when the ramp is in the first raised position.

The personal vehicle transportation device may include at least one bladder and the at least one bladder may be variably inflatable between a first non-inflated position and a second inflated position and when in the second inflated position the at least one bladder may be configured to secure a cargo within the shell. The at least one bladder may be attached to the frame. The at least one bladder may be attached to the shell.

The translation mechanism may rotationally translate the ramp and the shell. The translation mechanism may be operationally linked to a first cog set attached to the ramp and a second cog set attached to the shell. The translation mechanism may translate the ramp from the first raised position to the second lowered position and the shell from the first lowered position to the second raised position substantially simultaneously. The translation mechanism may include an electric motor operationally linked to the translation mechanism. The translation mechanism may include a manual crank operationally linked to the translation mechanism.

The ramp may be monolithic. The ramp may include at least two linked sections. The at least two linked sections may be connected by a hinge and the at least two sections fold together when the ramp is in the first raised position.

The device may include at least one wheel attached to the frame. The mounting arm may include a hinged joint dimensioned and configured to allow the frame to pivot upwards in relation to the towing vehicle, and further comprising a tension spring urging the hinged joint to remain in a position parallel to the frame.

According to another aspect of the invention, a personal vehicle transportation device includes a frame comprising a substantially horizontal platform, a shell attached to the frame and movable between a first lowered position and a second raised position and the shell substantially covers the horizontal platform when in the first lowered position, and the shell further comprises at least one inflatable bladder to secure a cargo between the frame and the shell, a ramp attached to the frame and movable between a first raised position and a second lowered position, a translation mechanism attached to the frame and operationally linked to the shell and the ramp by a first cog set attached to the ramp and a second cog set attached to the shell, and the translation mechanism may be configured to translate the shell from the first lowered position to the second raised position and translate the ramp from the first raised position to the second lowered position substantially simultaneously, the translation mechanism may be operationally linked to a manual crank, a mounting arm attached to the frame and configured to matingly engage a towing vehicle and the mounting arm further comprises a hinged joint configured to allow the frame to translate upwards in relation to the towing vehicle, and further includes a tension spring urging the hinged joint to remain in a position parallel to the frame.

The shell may include an opening defined therein and the opening may be substantially covered by the ramp when the ramp is in the first raised position. The device may include at least one bladder attached to the frame. The device may include an electric motor operationally linked to the translation mechanism.

According to another aspect of the invention, a personal vehicle transportation device includes a frame comprising a substantially horizontal platform, a shell attached to the frame and rotationally movable between a first lowered position and a second raised position and the shell substantially covers the horizontal platform when in the first lowered position, the shell has an opening defined therein, and the shell further comprises at least one inflatable bladder to secure a cargo between the frame and the shell, the at least one bladder may be mechanically or pneumatically inflated, a ramp attached to the frame and rotationally movable between a first raised position and a second lowered position, the ramp substantially may cover the opening defined in the shell when the ramp is in the first raised position, a translation mechanism attached to the frame and operationally linked to the shell and the ramp, the translation mechanism may be configured to translate the shell from the first lowered position to the second raised position and translate the ramp from the first raised position to the second lowered position substantially simultaneously, and a mounting arm attached to the frame and configured to matingly engage a towing vehicle and the mounting arm further comprises a hinged joint configured to allow the frame to translate upwards in relation to the towing vehicle, and further comprising a tension spring urging the hinged joint to remain in a position parallel to the frame.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced.

DETAILED DESCRIPTION OF THE INVENTION

Figure 1:
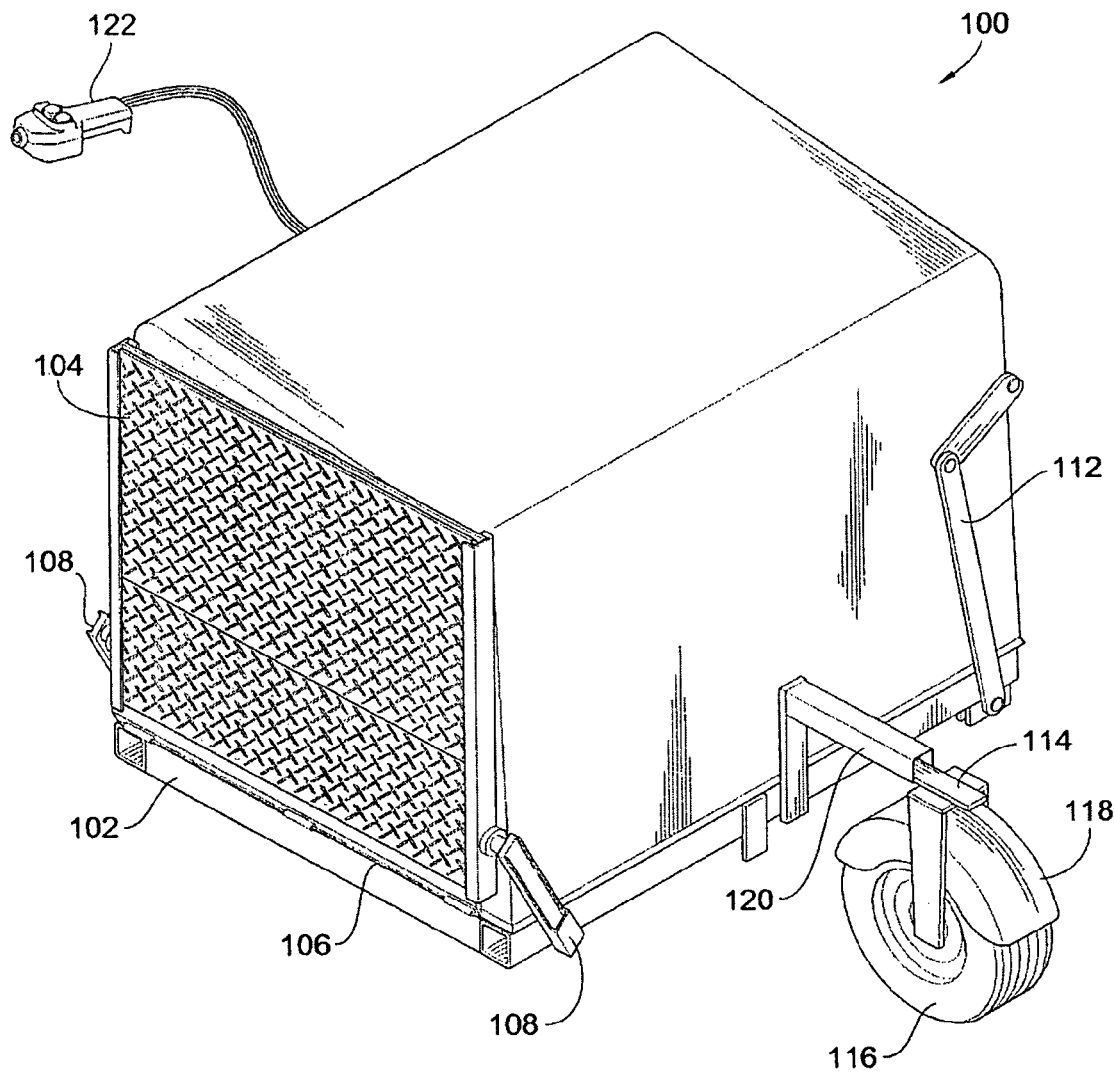
FIG. 1 is a perspective illustration of a personal vehicle transportation device with a ramp in a raised closed position and a shell in a lower closed position constructed according to principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention.

The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings. Also, the terminology used herein is for the purpose of description and not of limitation.

The term "personal vehicle" as used herein relates generally to any device that can be used to transport a single individual either seated or standing. Examples of a personal vehicle include, include but are not limited to, a traditional manually operated wheelchair or a motorized scooter.

The term "tow vehicle" as used herein means any automotive vehicle that is suitably equipped to tow behind it another object.

Figure 2:
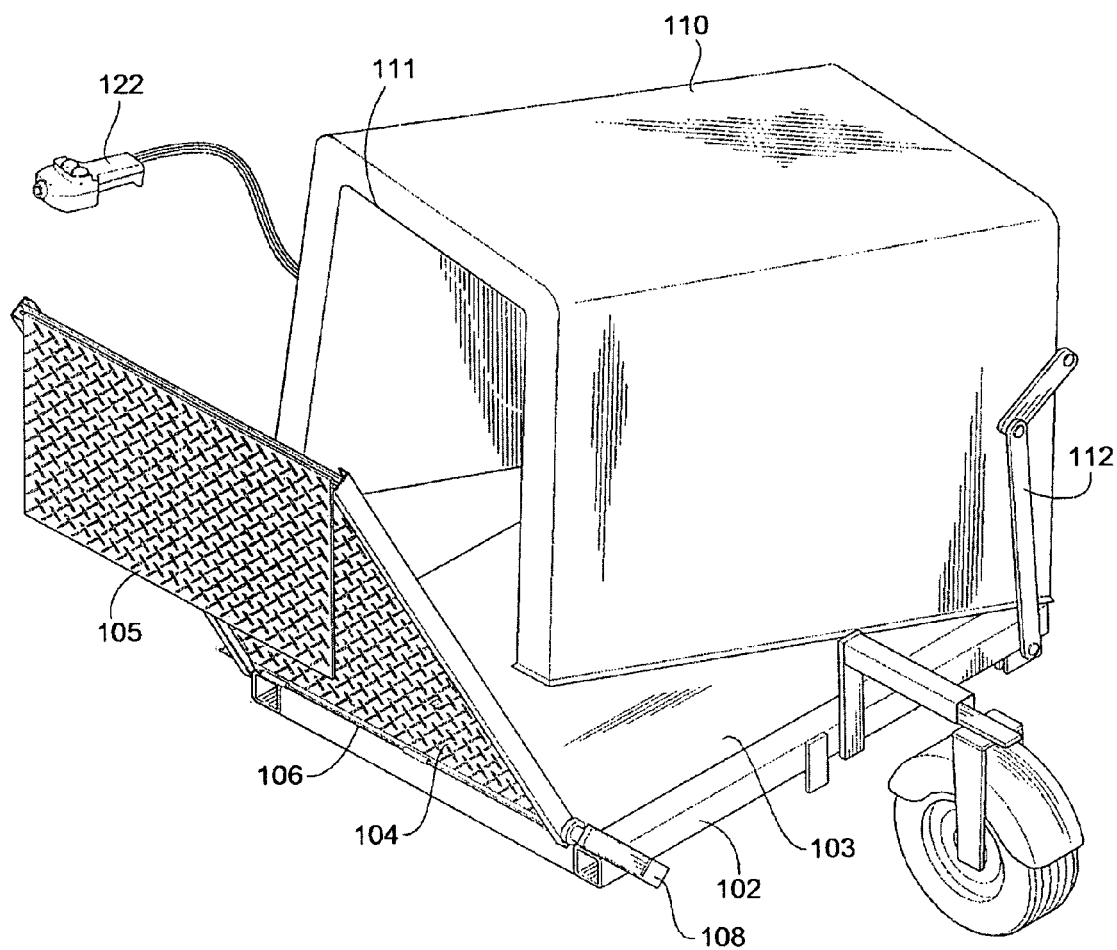
FIG. 2 is a perspective illustration of the personal vehicle transportation device with a two-section ramp of FIG. 1 in a partially lowered position and the shell in a partially raised position.

Referring now to FIG. 1, a perspective illustration of a personal vehicle transportation device 100 is illustrated. The device 100 may be employed for the protection and transportation of a personal vehicle, such as, for example, a wheelchair. The device may be made of any durable and rigid material suitable for over-road transportation. The device 100 may include a rigid frame 102 suitable to support the weight of the wheelchair and endure the stresses of over-road travel. The frame 102, as illustrated, is made of a tubular and welded metal. The frame may be made of any suitable material, such as aluminum, steel, or other non-metallic materials such as carbon fiber, plastic, or fiberglass. As shown in FIG. 2, frame 102 may include a horizontal platform 103. The horizontal platform is sized appropriately to support a wheelchair and be made of the same material as frame 102 or another suitable material. A ramp 104 may be movably attached to the frame 102 by hinge 106 and connector rods 108. A shell 110 may be attached to the frame 102 on the opposite side from the ramp 104. The shell 110 may be movably attached to the frame 102 by linked connector rods 112. The device may include a wheel unit 114 connected to the frame 102 via an adjustable connector 120, which may be adjustable both horizontally and vertically in relation to frame 102. The wheel unit 114 may include a road-worthy wheel and tire 116, which may be partially covered by a fender 118. A road-worthy tire 116 is capable of withstanding interstate highway speeds and distances. The operation of device 100 including ramp 104 and shell 110 may be remotely controlled by a remote control unit 122, which may be operationally connected to motor 405, shown in FIG. 4.

Referring now to FIG. 2, the device 100 is shown in a partially operational state. Ramp 104 is illustrated between a first raised position and a second lowered position. Ramp 104 pivots around an axis along an edge of the frame 102, which may include a hinge 106. The ramp 104 is actuated by the ramp connector rods 108 positioned on at least one side of the ramp 104 and frame 102. Ramp 104 may include a second section 105 connected to the ramp 104 at joint 107. As the ramp 104 is translated into the lowered position, section 105 swings outward to contact the ground. Section 105 may be actuated by means such as cables, chains, or other similar mechanisms operationally linked to ramp 104. Section 105 thereby extends the length of the ramp 104 and may create a decreased angle of slope between the horizontal platform 103 and the ground. The second section 105 may be the same size and shape as ramp 104, however it may be a different size or shape. Section 105 may also connect to the ramp 104 by other means, such as a telescoping extension. As illustrated, ramp 104 and section 105 are constructed of a "diamond plate" metal for increased traction. However, ramp 104 and section 105 may be made of any material suitable for a road-worthy device.

Figure 3:
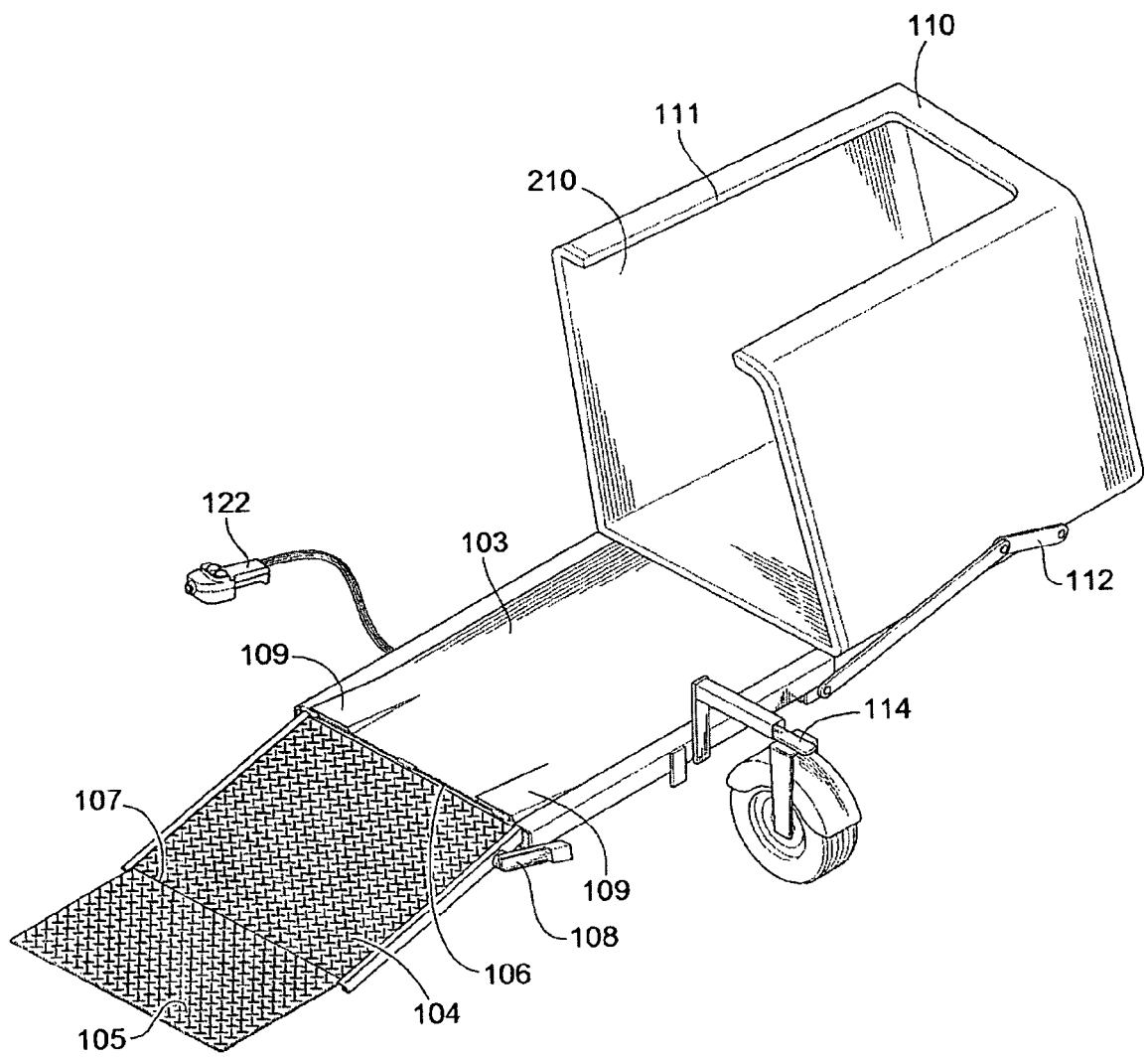
FIG. 3 is a perspective illustration of the personal vehicle transportation device with a two-section ramp of FIG. 1 in a lowered open position and the shell in a raised open position.

As shown in FIGS. 2 and 3, the shell 110 is movably attached to the frame 102 opposite the ramp 104. In FIG. 2, the shell is illustrated in a position between a first closed position and second open position. As shown in FIG. 3, the shell 110 is in the second open position. In an embodiment, the shell 110 is disposed with an opening 111. When the shell 110 is in the first closed position, the opening 111 is sufficiently covered by the ramp 104 when the ramp 104 is in the first raised position. In another embodiment, the shell has no opening. The shell 110 is moved from the first closed position to the second open position by actuation of the shell connector rod 112, which is attached to the frame 102 and the shell 110. When the shell 110 is in the second open position as shown in FIG. 3, the horizontal platform 103 is fully accessible. When the ramp 104 and section 105 are in the full second lowered position and the shell is in the second open position, a wheelchair may be rolled up the ramp 104 onto horizontal platform 103. The placement of the wheelchair on the horizontal platform 103 may be secured by wheel chocks 109 integral with the horizontal platform 103, thereby preventing the wheelchair from rolling back onto the ramp 104. The device 100 and horizontal platform 103 may also include other restraining devices such as hooks, cables, chains, or bungee cords to immobilize the wheelchair once it is in position. The shell 110 may include an interior space 210 sufficient to completely surround the wheelchair. In an embodiment, the shell 110 may be made of plastic, light-weight metal, carbon fiber, fiberglass, or any other suitable material for a road-worthy vehicle.

Figure 4:
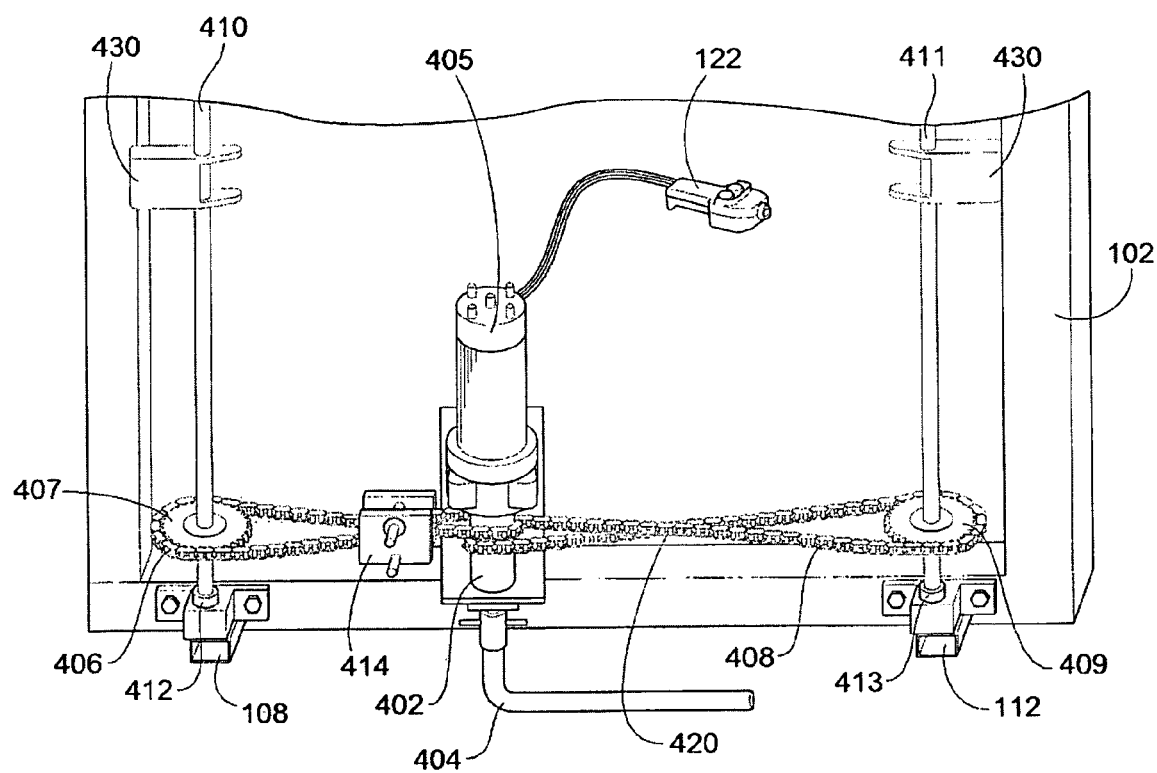
FIG. 4 is a schematic of the personal vehicle transportation device of FIG. 1 and a means for attachment to a towing vehicle.

FIG. 4 is a schematic of the power train in an embodiment of the device 100. The orientation of FIG. 4 is of the underside of the device 100 showing the underside 400 of the horizontal platform 103 and surrounded by the frame 102. In an embodiment, an electric motor 405 operates the opening and closing of the shell 110 and the raising and lowering of the ramp 104. In another embodiment, a manual crank 404 performs this operation. A rotational mechanism 402 is attached to the frame 102 underneath the underside 400 of the horizontal platform 103. On one side of the rotational mechanism 402, the ramp connector rod 108 is attached to shaft 410 at linkage 412. The ramp connector rod 108 and shaft 410 are operationally linked so that when shaft 410 rotates, ramp connector rod 108 also rotates. A cog 407 is attached to shaft 410. A chain 406 is wrapped around cog 407 and rotational mechanism 402. When the rotational mechanism 402 turns in a clockwise direction, chain 406 translates the rotational movement to cog 407, which turns shaft 410, which subsequently rotates ramp connector rod 108 in the same clockwise direction. This rotational movement causes the ramp 104 to raise or lower. Attached to the frame 102 on the other side of rotational mechanism 402 is shaft 411. Shaft 411 may be attached to shell connector rod 112 at linkage 413, which is attached to the frame 102. Cog 409 is attached to shaft 411. Belt 408 connects cog 409 with rotational mechanism 402. In an embodiment, belt 408 spans between cog 409 and rotational mechanism 402 in a figure-8 orientation. In a figure-8 orientation, belt 408 crosses itself at a point represented by point 420. Due to the figure-8 orientation, when rotational mechanism 402 turns in a clockwise direction, cog 409 turns in a counter-clockwise direction. Rotation of shaft 411 causes the shell to move between an open and a closed position. In combination, when shaft 411 and shaft 410 are both connected to the rotational mechanism 402, the shafts will move substantially simultaneously, yet in opposite directions. In an embodiment, this configuration allows the ramp 104 to be lowered simultaneously while the shell 110 is being opened, and vice versa. A belt tensioner 414 may be used. Shaft stabilizers 430 may be attached to the frame 102 and positioned at a midpoint along the shafts 410, 411 to stabilize rotational movement and vibration. Shafts 410, 411 may be connected to cogs 108, 112 on a single side of the frame 102, as shown in FIG. 4, or on an additional opposite side of the frame 102. In an embodiment, the rotational mechanism 402 is operated by an electric motor 405 controlled by a remote control 122. The rotational mechanism 402 may also be operated by a manual crank 404.

Figure 5:
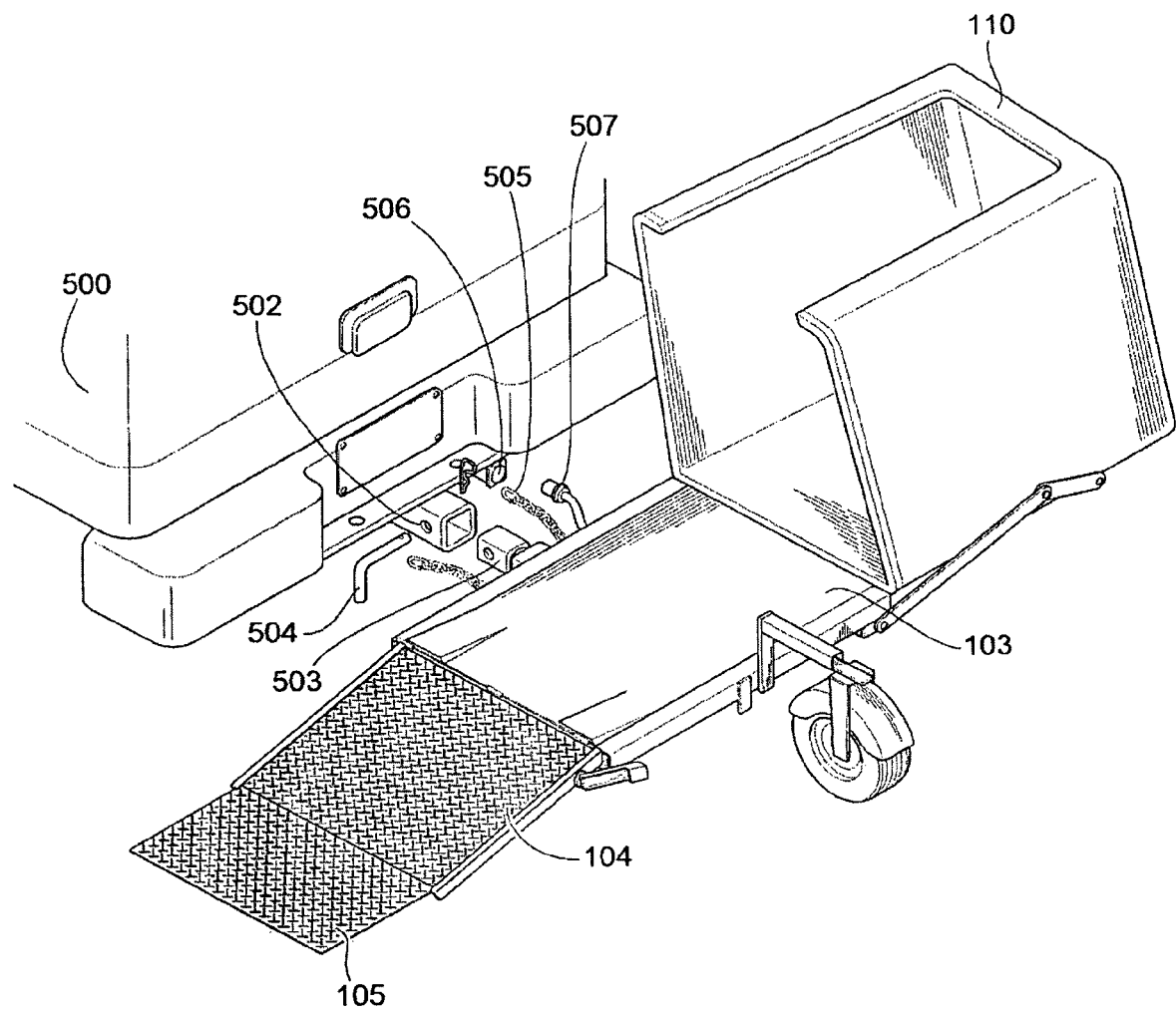

FIG. 5 illustrates an embodiment where the device 100 is attached to a tow vehicle 500. The device may have a standard male trailer hitch 503 and redundant safety chains 505 attached to the frame 102. The male trailer hitch 503 is conventionally inserted into a female trailer hitch 502 attached to the tow vehicle 500. A bolt or pin 504 connects the female 502 and male 503 trailer hitches. The redundant safety chains 505 may be attached to hooks or other structures on the tow vehicle 500. In an embodiment with an electric motor 405, the device 100 may acquire electrical power from an electrical socket 506 on the tow vehicle 500. The device 100 connects to the electrical socket 506 with an electric plug 507. In FIG. 5, the device 100 is shown with the ramp 104 in the lowered position and shell 110 in the open position, however the ramp 104 and shell 110 may be in any position when the device 100 is connected to the tow vehicle.

Figure 6:
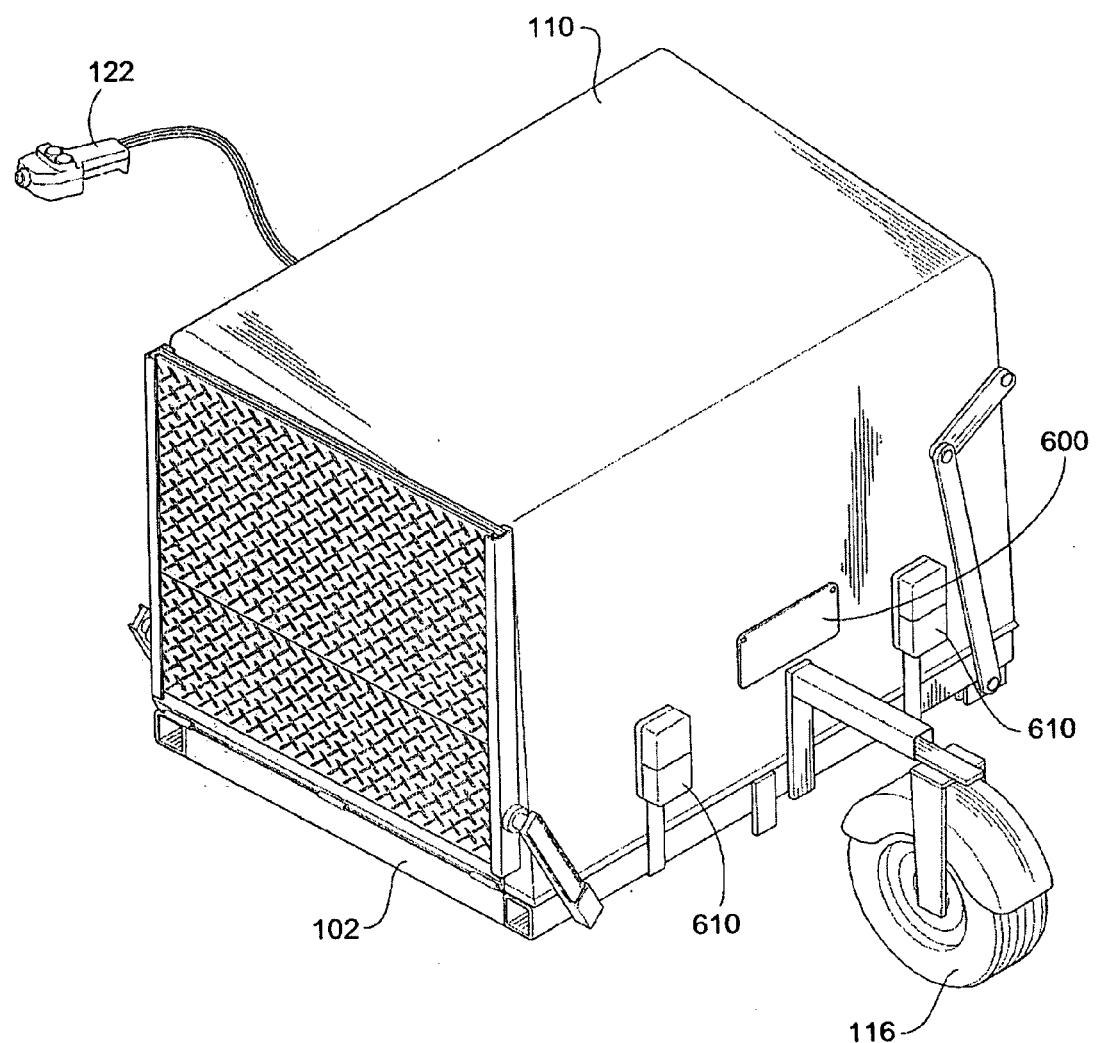
FIG. 6 is an illustration of the personal vehicle transportation device in FIG. 1 with additional accessories constructed according to principles of the invention.

FIG. 6 illustrates additional accessories that may be used with the device 100. A license plate, or other identification, bracket 600 may be attached to the shell 110 or another surface visible to another vehicle. To comply with various state and federal traffic laws, the device 100 may include various safety lights 610. The lights 610 may include brake lights, back-up lights, marker lights or other required signals. Lights 610, or any other electrical component on the device 100, may acquire power from the electrical plug 507 connecting to the electrical socket 506.

Figure 7:
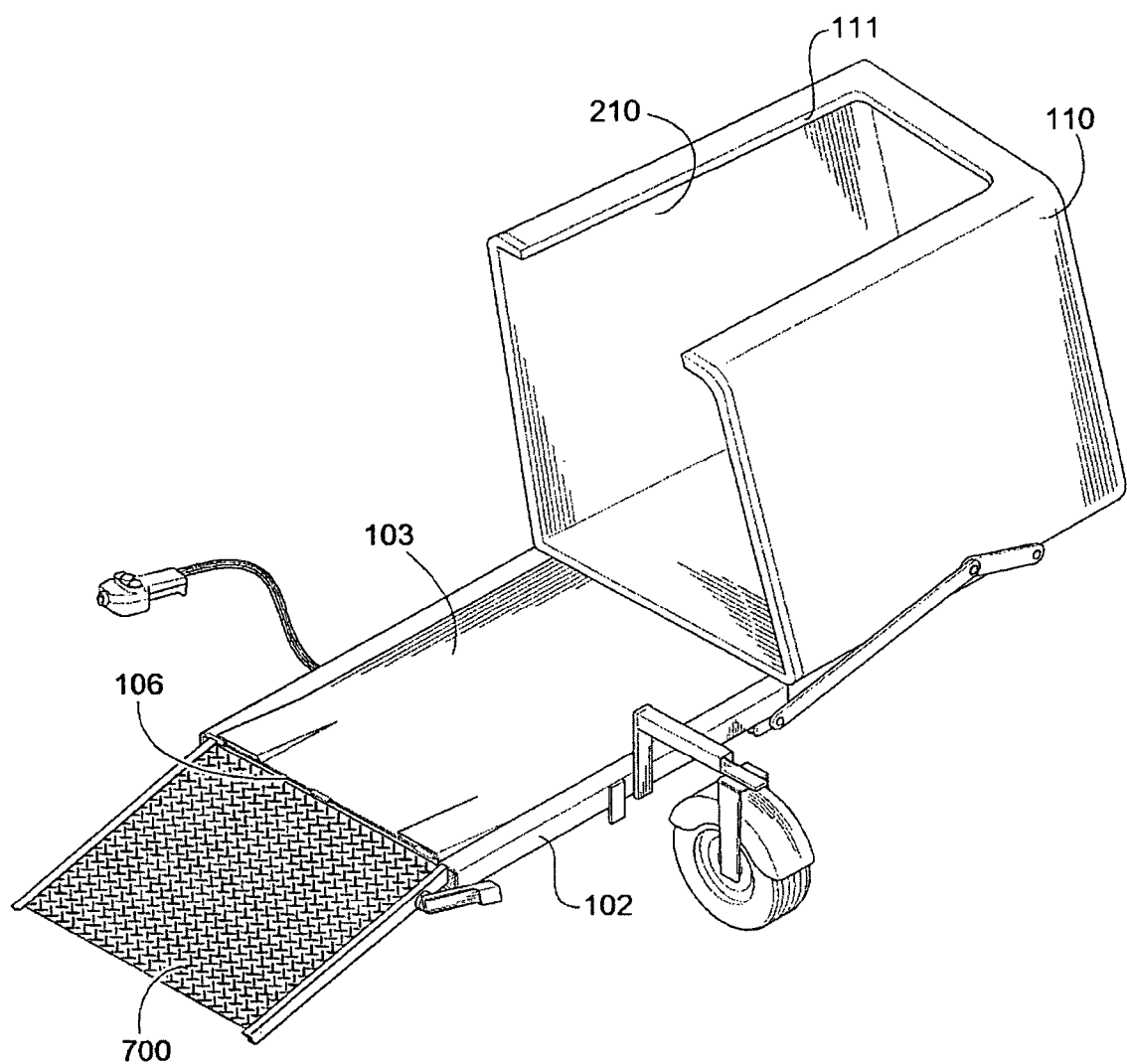
FIG. 7 is a perspective illustration of a personal vehicle transportation device with a monolithic ramp in a lowered open position and a shell in a raised open position constructed according to principles of the invention.

FIG. 7 illustrates an embodiment of the device 100 with a monolithic ramp 700. The monolithic ramp 700 may not have a secondary or additional attachment. The monolithic ramp 700 may attach to the frame 102 and the horizontal platform 103 in the same way as ramp 104.

Figure 8:
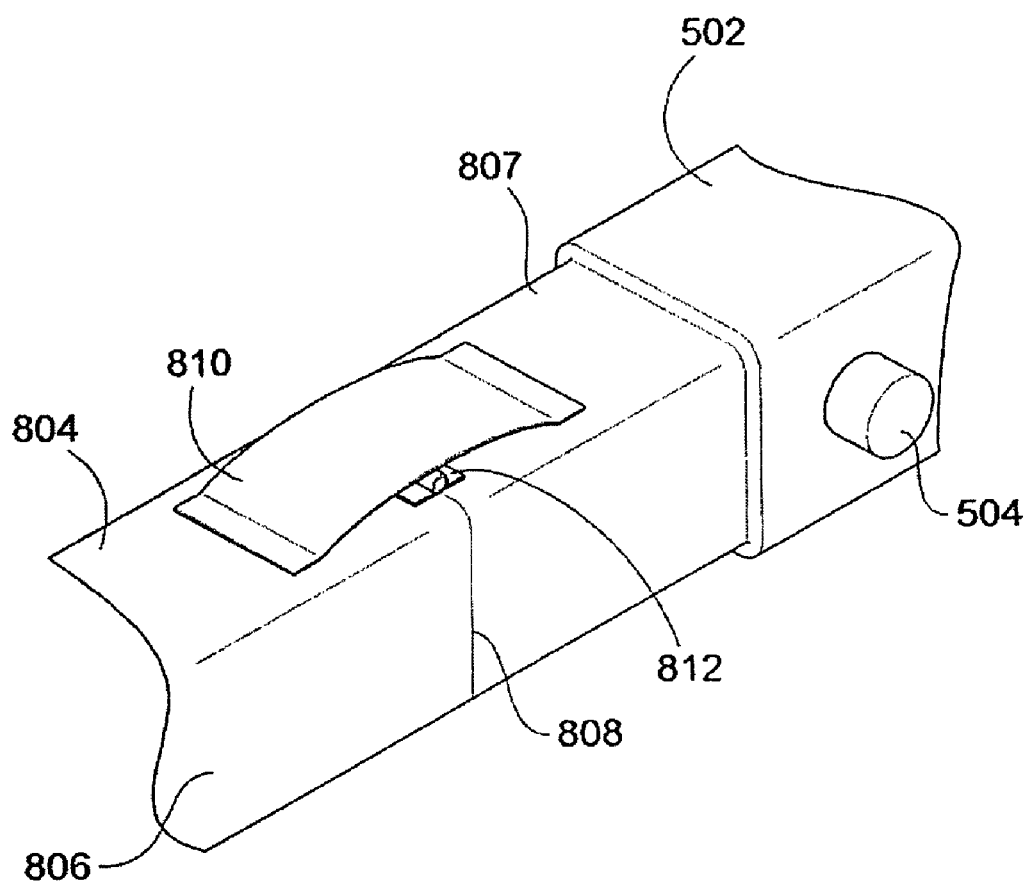
FIG. 8 is a schematic of a hinge mechanism connecting the personal vehicle transportation device to a towing vehicle constructed according to principles of the invention.

FIG. 8 is an illustration of an embodiment of the device 100 with a hinged male trailer hitch 804. The hinged hitch 804 includes a section 806 proximal to the frame 102 and a distal section 807. Distal section 807 may be inserted into a female trailer hitch 502 and thus secured with a bolt or pin 504. Proximal section 806 and distal section 807 form a joint 808 and are connected by a hinge 812. The hinge 812 is located on the side of the hinged hitch 804, which is opposite the road. Spanning over the hinge 812 and connected to both the proximal 806 and the distal 807 sections is a leaf spring 810. The leaf spring 810 urges the sections 806, 807 together at joint 808. The hinged hitch 804 allows the device 100 to move vertically in relation to the tow vehicle 500. The hinged hitch 804 may be actuated when the tow vehicle 500 and device 100 travel over bumpy or uneven roads and surfaces. The wheel unit 114 rides over bumps and, in turn, pushes the entire device 100 upwards causing the hinged hitch 804 to flex at hinge 812. The leaf spring 810 urges the device 100 back down.

Figure 9:
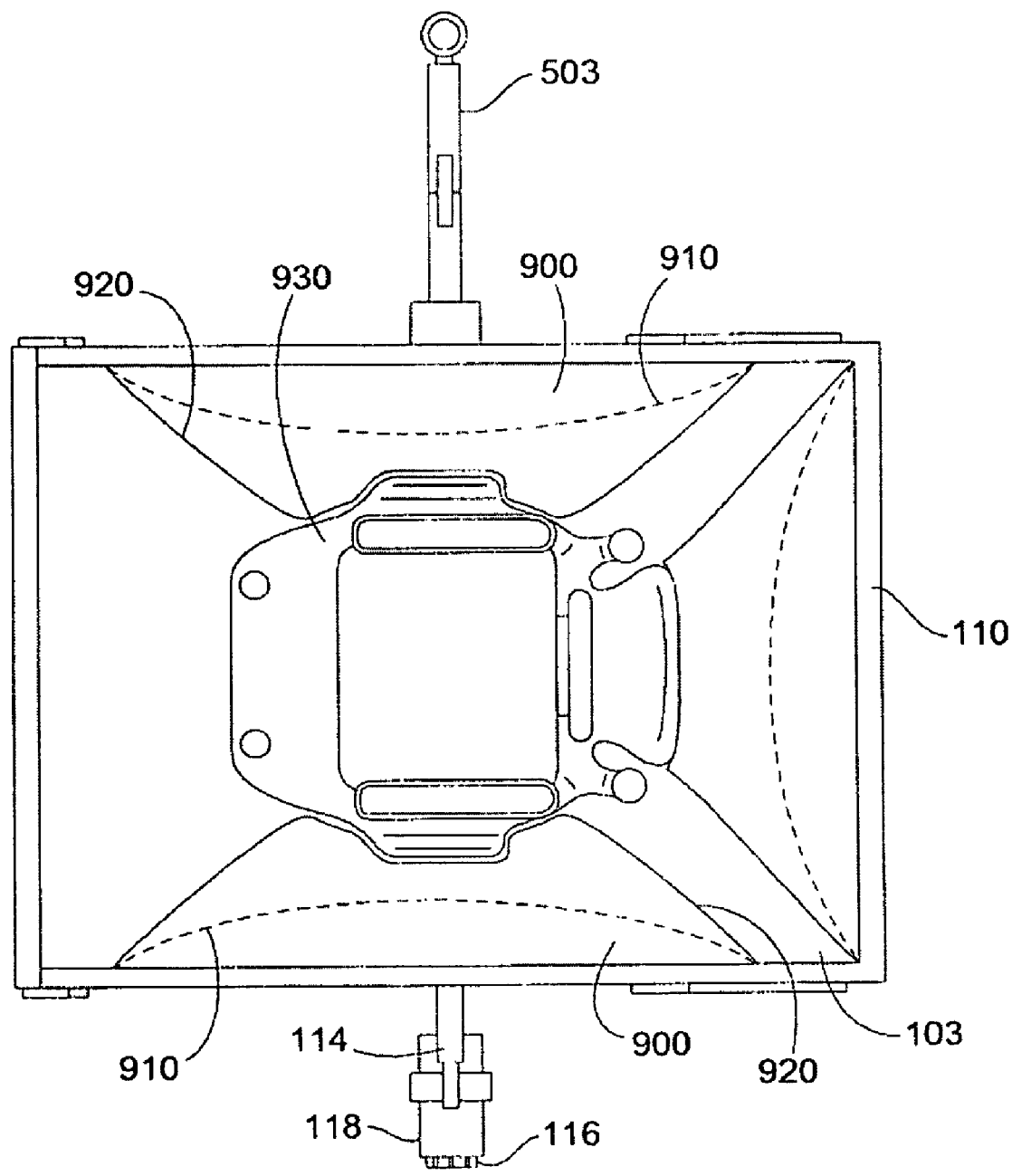
FIG. 9 is an illustration of the interior of a personal vehicle transportation device showing inflatable bladders surrounding a wheelchair constructed according to principles of the invention.

FIG. 9 is a top down view of the device 100 with the top portion of the shell 110 removed. A representative wheelchair 930 is resting on the horizontal platform 103. Walls of the shell 110 and the ramp 104 are visible. In an embodiment, the device 100 may include at least one inflatable bladder 900 attached on the interior 210 of the shell 110. The at least one inflatable bladder 900 may be any type of inflatable cushion or balloon made of a robust and substantially impenetrable material, such as rubber, latex, or any woven material. As shown in FIG. 9, the at least one bladder 900 may be secured to the inner walls of the shell 110 in a deflated position 910. In the deflated position 910, the at least one bladder 900 do not take up much space of the interior 210 of the shell 110 and do not touch the wheelchair 930 or other cargo. The at least one bladder 900 may be inflated to an inflated position 920 so that they come into contact with the wheelchair 930. With sufficient pressure in the at least one bladder 900 pressing against various sides of the wheelchair 930, the wheelchair is therefore stabilized inside of the device 100. When the need for security is no longer needed, the at least one bladders 900 may be deflated away from the wheelchair 930. Although not shown in the cutaway of FIG. 9, the interior top of the shell 110 may also have at least one inflatable bladder 900. In one embodiment the at least one inflatable bladder 900 may be attached to the frame 102. A specific orientation of the at least one bladder 900 is not imperative to the function, as long as at least one bladder 900 applies enough stabilizing force onto the wheelchair 930. The at least one inflatable bladder 900 may be pneumatically or hydraulically inflated. In an embodiment, the electric motor 405 may operate an air compressor, which may inflate the bladders via any commercially known series of manifolds and hoses. The at least one bladder 900 may be deflated by manual release of an airlock or via the electric motor 405.

The description and examples given above are merely illustrative and are not meant to be an exhaustive list of all possible designs, implementations, modifications, and uses of the invention. For example, while described herein as useful to carry a wheelchair, the invention may be suitable for carrying other cargo such as, but not limited to, all-terrain vehicles and bicycles. Furthermore, the invention may carry other cargo such as groceries or luggage. Moreover, features described in connections with one embodiment of the invention may be used in conjunction with other embodiments, even if not explicitly stated above.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A personal vehicle transportation device comprising:
    a frame comprising a substantially horizontal platform;
    a shell attached to said frame and movable between a first lowered position and a second raised position and wherein said shell substantially covers said horizontal platform when in the first lowered position, and wherein said shell further comprises at least one inflatable bladder to secure a cargo between said frame and said shell;
    a ramp attached to said frame and movable between a first raised position and a second lowered position;
    a translation mechanism attached to said frame and operationally linked to said shell and said ramp by a first cog set attached to said ramp and a second cog set attached to said shell, and wherein said translation mechanism is configured to translate said shell from the first lowered position to the second raised position and translate said ramp from the first raised position to the second lowered position substantially simultaneously, wherein said translation mechanism is operationally linked to a manual crank; and
    a mounting arm attached to said frame and configured to matingly engage a towing vehicle and wherein said mounting arm further comprises a hinged joint configured to allow said frame to translate upwards in relation to a horizontal plane of the towing vehicle, and further comprising a tension spring urging said hinged joint to remain in a position parallel to said frame,
    wherein said shell has an opening defined therein and wherein the opening is substantially covered by said ramp when said ramp is in the first raised position.

2. The transportation device of claim 1 further comprising at least one bladder attached to said frame.

3. The transportation device of claim 1 further comprising an electric motor operationally linked to said translation mechanism.

* * * * *